# 2,900,723
LAWN EDGER

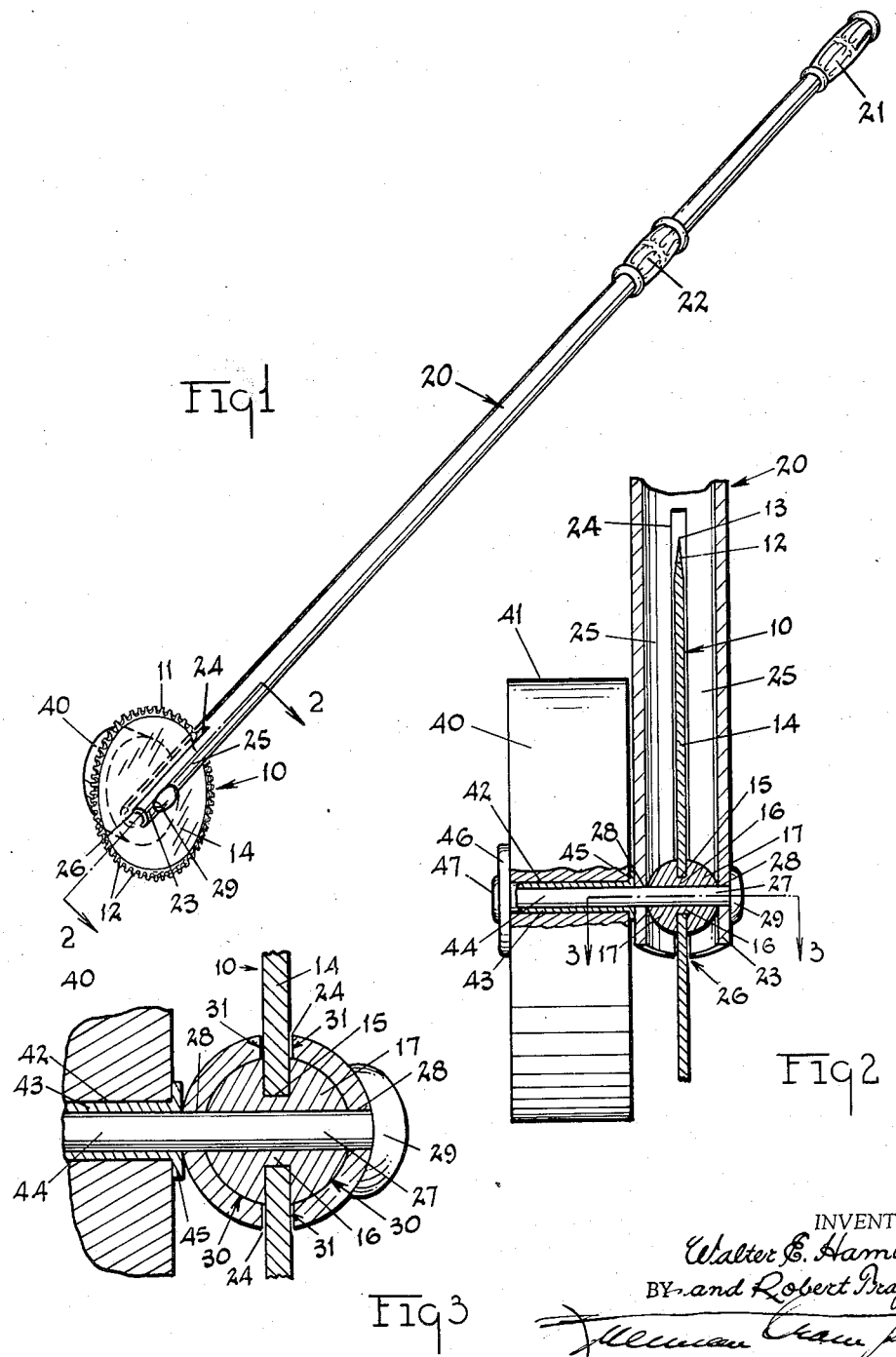

Walter E. Hamilton and Robert Trafelet, Toledo, Ohio

Application January 20, 1958, Serial No. 709,827

1 Claim. (Cl. 30—319)

Our invention relates generally to agricultural tools and particularly to hand operated lawn and sod cutter tools of the type adapted for trimming and edging a lawn where it meets or extends along sidewalk, curbing, driveway areas and the like.

The invention, in summary, resides in an arrangement of means and elements, including those elements comprising said means, by which a rotatable lawn and sod cutting disc is mounted on a handle essentially characterized by the fact that the handle is an elongated member having one end which is slotted to form integral bifurcations thereof which have journal bearings near the free ends to receive and bear a journal sleeve affixed to and supporting the disc aforesaid. In its more preferred concept, the invention, in summary, contemplates that the bifurcated end of the handle shall be of tubular form, thus, to provide semi-cylindrical housings on either side of the disc adapted to enclose the journal sleeve and the thrust bearings mounted thereon or on the disc. In addition, and in further summary, the invention contemplates that at least one of the slots forming and extending between the bifurcations in the handle end shall be of a width substantially equal to the thickness of the disc web whereby the disc in its rotation relative to the handle, will be held by the slot edges against departure from a desired and prescribed plane of rotation and so that sod and lawn material or other debris adhering to the disc web will be scraped away by the slot edges.

Our invention has for its chief object to provide a low cost, easily operable and efficient lawn edger. A further object of our invention is to provide a lawn edger structure that is greatly improved in arrangement and function over such structure as those shown in United States Letters Patents Nos. 1,964,366; 2,252,888 and 2,673,396.

Our invention has for other and further objects those of providing advantageous structures and arrangements which will appear from the following description and from an examination of the accompanying drawing. Lawn edgers containing our invention may take various forms of which we have selected one to describe hereinafter, since the one we select now appears to us as the best mode by which our invention may be carried out. In describing the selected form, reference to the accompanying drawings will from time to time be made. However, neither such reference nor the description which here follows should be construed as implying that variations from the form so described and shown are beyond the contemplation of the invention made manifest herein.

Fig. 1 of the accompanying drawing illustrates a side view, in elevation, of a lawn edger embodying our invention.

Fig. 2 of the drawing shows an enlarged view of a section of the lawn edger shown in Fig. 1 taken along the plane of the line 2—2 indicated in Fig. 1.

Fig. 3 of the accompanying drawing illustrates an enlarged view of a section taken along the plane of the line 3—3 indicated in Fig. 2.

The lawn edger illustrated in the accompanying drawing has, as its principal parts, a cutting disc 10, a handle 20 and a gauge roller 40.

The cutting disc 10 has an edge 11 comprising a plurality of spaced or relieved castelate teeth 12 each having a sharp edge 13, adapted to easily cut through lawn and sod when pressed down upon the same. The teeth 12 are supported on a web 14 that extends from a hub 15 of the disc. A journal sleeve 16 extends coaxially through the hub 15 and is fixed, as by brazing or swedging, to the disc. The sleeve 16 preferably has thickened opposite ends 17 which may be formed hemi-spherical or dome-shaped in outline to provide thrust bearings that cooperate with parts of the handle 20 in a manner that will be described hereinafter.

The handle 20 is an elongated member commonly known as a "pole" type handle. On its upper end a hand grip 21 may be provided. A second hand grip 22, on the handle 20 and spaced a short distance from the grip 21, provides an added convenience to the manipulation of the handle 20 and thus the lawn edger tool. Preferably, the handle 20 is a tubular metal body giving desired rigidity with minimum weight to the tool. The tubular characteristic of the handle, particularly in the vicinity of its lower end 23 is advantageous for other reasons that will appear.

The lower end 23 of the handle 20 is bifurcated. Preferably, a pair of spaced open end slots 24 are cut in the lower end 23 of the handle to extend along lines extending parallel to the major longitudinal axis of the handle 20 and in diametric relation to each other and to said axis. The slots 24 are of a preferred length that is greater than the radius of the disc 10 and less than the diameter thereof. Portions of the handle 20 on either side of the slots 24 form legs 25, integral with the handle 20, that in cross-section are semi-cylindrical and in length are long enough to receive the disc 10 therebetween to a sufficient depth that the ends of said legs 25 may be easily brought to registry with the hub 15 of the disc.

In assembly of the disc 10 with the legs 25 of the handle 20, the disc is put in plane with the slots 24 and so that the bearings 17 are aligned with open ends 26 of the legs 25. The disc 10 and handle are then moved translatorily to effect an insertion of the disc between the legs 25. In order to hold the disc 10 in such position and to provide means by which manual pressure on the handle 20 may be applied to the disc, we provide a stub shaft 27.

As shown in the accompanying drawing, the stub shaft 27 extends through opposed bearing openings 28, each formed in a leg 25 of the handle 20. The shaft 27 is adapted to bridge the space between the legs 25 and extend through the journal sleeve 16 of the disc 10. Hence, the shaft 27 provides a journal support for the cutting disc.

Preferably, the shaft 27 is fixed against rotation relative to the handle 20 and to that end has a head 29 that may be peened about the outside of one of the legs 25. As will now be seen from Fig. 2 of the accompanying drawing, the bearing 17, being of a size substantially equal to the inner diameter of the legs 25 and conforming in shape thereto, will bear on inner semi-cylindrical surfaces 30 of said legs. The described relation between the bearings 17 and surfaces 30 serves not only to house the bearings but also to retain the disc 10 in a plane of rotation that is substantially medial of the slots 24, against forces that may be applied to either side of the web 14 of the disc.

Further resistance to displacement of the disc 10 from a chosen plane of rotation is provided by the slots 24. Preferably, the slots are only of such width that will permit rotation of the disc 10 between the legs 25 without binding with edges 31 of the slots 24. However, if the disc 10 by reason of lateral pressures applied to its web 14 or edge 11 tend to be deflected from its prescribed plane of rotation, the disc will be engaged by one of the edges 31 and held against further deflection. The edges 31 also serve the useful function of removing any debris, such as sod or loam, that may adhere to the web or toothed edge of the disc. As the disc rotates, adhering debris is engaged and scraped off the disc by the edges 31 as the disc passes between the legs 25.

It is often of material advantage, when using a lawn edger tool, to have a guiding gauge. To provide such gauge on the lawn edger shown in the accompanying drawing, the gauge roller 40 is mounted on the handle 20. The roller 40 may be a solid drum-shaped body having a wide flat rim 41 and a hub 42. A bearing sleeve 43 extends through the hub 42 of the roller 40 and is adapted to journal on a cantilever extension 44 of the shaft 27.

The extension 44 projects beyond and is in offset relation to the legs 25 and disc 10. Preferably, the sleeve 43 has a portion 45 which extends slightly beyond one side of the roller 40 and provides a spacer unit for positioning the roller 40 on the shaft extension 44 in spaced relation to the thereto nearest leg 25 of the handle 20. To hold the roller 40 on the shaft extension 44, a washer 46 embraces free end 47 of the extension 44 and is connected thereto by a suitable braze or swedging of end 47.

Thus, it will be seen that the roller 40 and disc 10 are free to rotate independently upon the shaft 27 and its extension 44. This makes for easier operation of both the disc in its cutting function and roller in its guiding gauge function. It will be also seen that in this and other particulars we provide an exceedingly simple, low cost and highly efficient lawn edger.

We claim:

A lawn edger comprising, in combination, an elongated tubular member; one end of the member having a hand grip part by which the member may be manipulated; the opposite end of the member having a pair of slots of equal lengths and substantially uniform width throughout their lengths and extending from the mentioned other end of the member along straight lines parallel to the longitudinal axis of the member in diametrically opposite relation to each other for a distance less than the member length; the member having a pair of facing axially aligned openings at diametrically opposite points on opposite sides of the slots and spaced circumferentially about the member substantially ninety degrees from the slots and having their common axes normal to the longitudinal axis of the member and to the extension of the slots; a rotatable lawn and sod cutting disc having a radius of a length less than the length of the member slots and an opening coincident with its axis of rotation; a sleeve having substantially semi-spherical and identical end portions and a substantially cylindrical intermediate portion; the sleeve intermediate portion extending through the disc opening to support the sleeve end portions on opposite sides of and in engagement with opposite faces of the disc web whereby the sleeve and disc are interlocked and move as a unit; the sleeve end portions being each of a dimension and spaced from the other a distance that the semi-spherical surfaces thereof substantially fit the inner cylindrical surfaces of the mentioned member end on opposite sides of the slots when the disc with the therewith interlocked sleeve is inserted edgewise into the slots to a depth in excess of the length of disc radius and in such fitting provides both a bearing to sustain relative rotation of the disc and member end closure for substantially closing the otherwise open other end of the member; the disc being of a thickness substantially equal to the width of the slots whereby deflection of the disc is restricted by engagement of the disc web surface with the slot edges and lawn edging debris adhering to the disc may be scraped therefrom in the rotation of the disc relative to the member; a stub shaft in extension through the opening and the sleeve and adapted to provide a journal connection between the disc and the member allowing rotation of the disc relative to the member; the stub shaft having an end extension beyond and to one side of the member; and a roller of less diameter than the disc and having a journal bearing sleeve portion thereon adapted to receive and bear on the stub shaft end extension to thus support the roller for rotation independently and at one side of the disc and member whereby the roller may in engaging a surface act to guide and limit the movement of the disc in lawn edging.

References Cited in the file of this patent

UNITED STATES PATENTS

| | | |
|---|---|---|
| 816,459 | Gates | Mar. 27, 1906 |
| 1,152,093 | Isaacs | Aug. 31, 1915 |
| 1,672,416 | La Clair | June 5, 1928 |
| 1,964,366 | Schwarz | June 26, 1934 |
| 2,480,002 | Danielson | Aug. 23, 1949 |